United States Patent [19]

Nakamura et al.

[11] Patent Number: 4,554,224

[45] Date of Patent: Nov. 19, 1985

[54] HYDROGEN-OXYGEN SOLID ELECTROLYTE FUEL CELL

[75] Inventors: Osamu Nakamura, Ikeda; Isao Ogino, Minoo; Masakazu Adachi, Takarazuka, all of Japan

[73] Assignees: Agency of Industrial Science and Technology; Ministry of International Trade and Industry, both of Tokyo, Japan

[21] Appl. No.: 575,215

[22] Filed: Jan. 30, 1984

[51] Int. Cl.$^4$ .................... H01M 8/10; H01M 4/86
[52] U.S. Cl. .................... 429/30; 429/33; 429/40
[58] Field of Search .................... 429/30, 33, 40

[56] References Cited

U.S. PATENT DOCUMENTS

| | | |
|---|---|---|
| 3,134,697 | 5/1964 | Niedrach .................... 429/30 |
| 3,207,682 | 9/1965 | Oswin et al. .................... 429/40 X |
| 3,271,197 | 9/1966 | Lyons .................... 429/17 |
| 3,377,265 | 4/1968 | Caesar et al. .................... 429/40 X |
| 3,684,578 | 8/1972 | Makishima et al. .................... 429/33 |
| 3,899,357 | 8/1975 | Rinaldi et al. .................... 429/42 |
| 4,024,036 | 5/1977 | Nakamura et al. .................... 429/33 X |

Primary Examiner—Brian E. Hearn
Assistant Examiner—Stephen J. Kalafut
Attorney, Agent, or Firm—Oblon, Fisher, Spivak, McClelland & Maier

[57] ABSTRACT

A hydrogen-oxygen solid electrolyte fuel cell using $Cu_2O$ as a cathode catalyst.

4 Claims, 3 Drawing Figures

HYDROGEN-OXYGEN SOLID ELECTROLYTE FUEL CELL

BACKGROUND OF THE INVENTION

This invention relates to a hydrogen-oxygen solid electrolyte fuel cell characterized by using $Cu_2O$ as an oxidizing agent electrode (cathode) catalyst.

The fuel cell is a power generating apparatus for producing electric current by electrochemical reaction of a fuel with an oxidizing agent. Owing to its high power generating efficiency, the fuel cell has come to attract increasing attention. Today, research and development on the fuel cell are well advanced.

The hydrogen-oxygen solid electrolyte fuel cell is basically constructed of a fuel electrode (anode), an oxidizing agent electrode (cathode), a solid electrolyte intimately interposed between the two electrodes, and housings for supplying hydrogen and oxygen (or air) respectively to the fuel electrode and the oxidizing agent electrode. The following reactions take place at these electrodes:

| Fuel electrode | $H_2 \rightarrow 2H^+ + 2e^-$ |
|---|---|
| Oxidizing agent electrode | $\frac{1}{2} O_2 + 2e^- \rightarrow O^{2-}$ |
| " | $O^{2-} + 2H^+ \rightarrow H_2O$ |
| Overall reaction | $H_2 + \frac{1}{2} O_2 \rightarrow H_2O$ |

The electromotive force (potential difference) which is produced by the aforementioned reaction is theoretically 1.23 V at 25° C. Actually, it is on the order of about 0.8 to 0.9 V because the aforementioned reaction is accompanied by secondary reactions such as the formation of $H_2O_2$ when an acidic electrolyte is used, for example. The polarization inside the cell which functions as resistance to the generation of electric current occurs in varying forms, including the resistance polarization which is the resistance offered by the electrolyte itself, the activation polarization (ionization polarization and reaction polarization) which takes place at the electrodes, and the concentration polarization which arises during supply of the reaction gas. Owing to these various polarizations, the cell voltage declines in proportion as the electric current increases.

For the purpose of obtaining as high cell voltage and as high electric current as possible, therefore, it is imperative that the aforementioned secondary reactions and polarizations should be repressed to the fullest possible extent. To this end, the development of an electrolyte possessing high proton conductivity and the development of an electrode catalyst, particularly an oxidizing agent electrode catalyst, are required among all the catalysts of this kind, platinum type catalysts now stand out in various respects. Because of practical difficulties such as high cost and scarcity of supply, however, there persists a demand for a new catalyst which can take the place of such platinum type catalysts. Fuel cells of the type adapted to operate at high temperatures involve reactions of high rate and do not especially require catalysts. In the case of solid electrolyte fuel cells adapted to operate at low temperatures such as room temperature as contemplated by the present invention, development of a new electrode catalyst proves to be an indispensable requirement.

The inventors have already developed solid electrolytes which possess high proton conductivity (namely, low resistance polarization), i.e. 12-molybdophosphoric acid, $H_3Mo_{12}PO_{40}\cdot 29H_2O$ (hereinafter referred to as "12-MPA") and 12-tungstophosphoric acid, $H_3W_{12}PO_{40}\cdot 29H_2O$ (hereinafter referred to as "12-WPA") exhibiting conductivity of 0.2 mho·cm$^{-1}$ at 25° C. (O. Nakamura et al., Chem. Lett., 1979, 17–18).

For the development of a hydrogen-oxygen solid electrolyte fuel cell of the type which can operate at low temperatures, however, the development of an oxidizing agent electrode catalyst capable of taking the place of a platinum type catalyst as described above is an essential requirement similarly to the development of a solid electrolyte of high proton conductivity.

Such an oxidizing agent electrode catalyst as suits the purpose just mentioned is disclosed by U.S. Pat. No. 3,899,357, for example. This is a composite of oxides of transition metals including copper. It is, however, too expensive to be economically feasible. It has much room for further improvement.

An object of this invention is to provide a novel oxidizing agent electrode catalyst which far excels the aforementioned known catalyst in terms of feasibility and takes the place of a platinum type catalyst advantageously.

SUMMARY OF THE INVENTION

To attain the object described above, the inventors continued a study on various compounds possessing attributes of oxide P-type semiconductors with a view to developing a catalyst for use with an oxidizing agent electrode susceptible of heavy polarization. They have consequently found that $Cu_2O$ in particular can be advantageously used as an oxidizing agent electrode catalyst. The present invention has issued from this knowledge.

To be specific, this invention relates to a hydrogen-oxygen solid electrolyte fuel cell of the type adapted to operate at room temperature, comprising an oxidizing agent electrode formed of an oxidizing agent electrode catalyst and a conducting agent, a fuel electrode, a solid electrolyte interposed between the two electrodes, housings adapted to supply oxygen to the oxidizing agent electrode and hydrogen to the fuel electrode respectively, which fuel cell is characterized by the aforementioned oxidizing agent electrode catalyst being formed of $Cu_2O$.

DESCRIPTION OF THE PREFERRED EMBODIMENT

Figure 1:
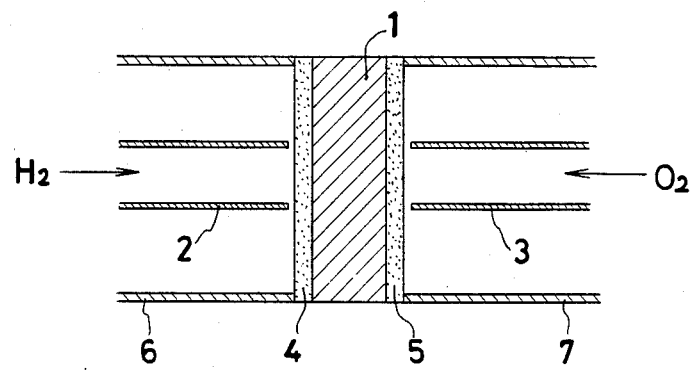
FIG. 1 is a schematic diagram illustrating a typical hydrogen-oxygen solid electrolyte fuel cell according to the present invention.

The $Cu_2O$ to be used in the present invention is not specifically defined, although it is available in different grades having slightly different levels of activity. For example, commercially available $Cu_2O$ of reagent grade may be used in its unaltered form. Otherwise, the $Cu_2O$ obtained by reducing $Cu(CH_3COO)_2$ and $Cu(OH)_2$ as with hydrazine at temperatures in the range of from room temperature to about 90° C. may be used. $Cu_2O$ is used in its powdered form. Similarly to platinum black, it is generally mixed with such a conducting material as flake graphite or activated carbon in an approximate ratio of 1:10 to 10:1 (by weight) to afford an oxidizing agent electrode. When the amount of $Cu_2O$ deviates from the range mentioned above, the fuel cell fails to generate the electric current aimed at by the present invention.

By the study conducted by the inventors, it has been ascertained that the catalytic activity of $Cu_2O$ depends on the degree of crystallization of the individual particles making up the $Cu_2O$ powder, i.e. the diameter, surface area, and surface conditions of the particles making up the $Cu_2O$ powder and that the catalytic activity tends to increase in proportion as the degree of crystallization of the individual particles of the $Cu_2O$ powder, as will also be clear from the embodiments described below. This may possibly be because $Cu_2O$ of a low degree of crystallinity is susceptible to disturbance in the arrangement of the oxygen atoms near the surface of the crystals and consequently facilitates participation of oxygen atoms in the surface reaction. In all the $Cu_2O$ types enumerated above, the $Cu_2O$ which is obtained by reducing $Cu(CH_3COO)_2$ with hydrazine at room temperature is desirable in the sense that it possesses the highest catalytic activity.

Where both the fuel electrode and the oxidizing agent electrode are formed of platinum black-flake graphite, the maximum current density (hereinafter referred to as "MCD") is about 100 mA/cm$^2$. Where the fuel electrode is formed of platinum black-flake graphite and the oxidizing agent electrode is formed of $Cu_2O$-flake graphite, the MCD varies in the range of about 29 to 50 mA/cm$^2$ depending on the degree of crystallinity of $Cu_2O$ to be used, as demonstrated in the working example cited afterward. Such high levels of MCD have never been attained by any catalyst other than platinum type catalysts. Besides being inexpensive, $Cu_2O$ proves highly feasible as an oxidizing agent electrode catalyst.

A solid electrolyte for use in this invention can be prepared by compression molding the aforementioned 12-MPA and/or 12-WPA alone or in conjunction with a proper carrier in a desired shape by a desired method. For example, the aforementioned powder may be molded in the form of a pellet 7 to 50 mm in diameter and 1 to 10 mm in thickness in a press die under pressure of 100 to 2000 kg/cm$^2$. The press die to be used in this case is desired to be made of epoxy resin reinforced with glass fibers. A press die made of metal cannot be used for the molding of 12-MPA and 12-WPA because the metal of the die reacts with hexavalent molybdenum ion and/or tungsten ion.

Then, the fuel electrode and the oxidizing agent electrode are applied fast to the opposite end faces of the solid electrolyte pellet obtained as described above. This fast adhesion may be effected at the same time that the solid electrolyte is molded in the form of a pellet. In this case, a mixture of $Cu_2O$, a novel catalyst, with a conductive material such as, for example, the $Cu_2O$-flake graphite mixture can be used as the oxidizing agent electrode and a known electrode such as, for example, the platinum black-flake graphite can be used as the fuel electrode.

Subsequently, the gas housings for hydrogen and oxygen are disposed respectively behind the fuel electrode and the oxidizing agent electrode.

One typical hydrogen-oxygen solid electrolyte fuel cell of this invention obtained as described above is depicted in FIG. 1. In FIG. 1, the fuel cell of this invention is constructed of tubes (6), (7) made of carbon, a fuel electrode (4), an oxidizing agent electrode (5), a solid electrode (1), and tubes (2), (3) of carbon to be used for the introduction of gases. The fuel electrode (4), the solid electrolyte (1), and the oxidizing agent electrode (5) are interposed between the carbon tubes (6), (7) and are air-tightly fastened with a sealing agent to the carbon tubes (6), (7). Since the carbon tubes (6), (7) are electrically held in contact respectively with the fuel electrode (4) and the oxidizing agent electrode (5), they concurrently serve as gas housings and as lead wires. When hydrogen gas and oxygen gas are fed through the aforementioned carbon tubes (2), (3) at a flow speed of 10 ml/min, for example, the unaltered portions of these gases are discharged as passed outside the tubes (2), (3).

To test the fuel cell for performance, a voltmeter is interposed between the fuel electrode and the oxidizing agent electrode and a load is connected to an external circuit as is well known, though not shown in the diagram.

For the sake of the fuel cell of this kind, the development of an electrode catalyst, particularly an oxidizing agent electrode catalyst, which has the lowest possible polarization or the highest possible electrode reaction rate is extremely important as pointed out above. The hydrogen-oxygen solid electrolyte fuel cell of this invention adapted to operate at low temperatures proves to be inexpensive because of use of $Cu_2O$, a substance possessing a catalyst activity approximating the catalyst activity of platinum type catalysts, as a novel oxidizing agent electrode catalyst. The adoption of this novel catalyst is expected to broaden further the scope of applications of the fuel cell.

Now, the present invention will be described more specifically below with reference to working examples.

EXAMPLE 1

The following types of $Cu_2O$ powder were used.

(A) A product obtained by dissolving 10 g of $Cu(CH_3COO)_2$ (guaranteed reagent made by Kishida Chemical) in 160 ml of water, mixing the resultant aqueous solution with 15 ml of an aqueous 20% hydrazine solution, heating the resultant mixture to about 80° C. thereby inducing precipitation of $Cu_2O$, separating the precipitate by filtration, and washing and drying the separated precipitate.

(B) A product obtained by following the procedure of (A), except that the reaction was carried out at room temperature.

(C) A product obtained by following the procedure of (A), except that $Cu(OH)_2$ (reagent grade made by Nakarai Chemical) was used in the place of $Cu(CH_3COO)_2$ and the reaction was carried out at room temperature. The purity of this product was about 80%.

(S) Commercially available $Cu_2O$ powder (reagent grade made by Nakarai Chemical).

The hydrogen-oxygen solid electrolyte fuel cell of this invention was prepared as described below using the various $Cu_2O$ types mentioned above.

About 2 g of single crystals of 12-MPA obtained by preparing a saturated aqueous solution of 12-MPA and lowering the temperature of the aqueous solution from 25° C. to 22° C. were crushed in an atmosphere kept at a relative humidity of 85 to 95% to afford powdered 12-MPA. With a press die made of epoxy resin reinforced with glass fibers, the 12-MPA powder was compression molded under pressure of 1000 kg/cm² to produce a pellet 18 mm in diameter and 3 mm in thickness.

Then, to one end surface of the pellet thus produced, 100 mg of a mixture consisting of 20% by weight of platinum black and 80% by weight of flake graphite was applied fast by an ordinary method to give rise to a fuel electrode (hydrogen electrode). To the other end surface of the pellet, 100 mg of a mixture consisting of 50% by weight of the $Cu_2O$ powder of (A), (B), (C), or (S) mentioned above and 50% by weight of flake graphite was applied fast by an ordinary method to give rise to an oxygen electrode (oxidizing agent electrode). Absolutely no reaction was observed to occur between the 12-MPA and $Cu_2O$. Thereafter, gas housings for hydrogen and oxygen were disposed behind the hydrogen electrode and the oxygen electrode respectively.

A voltmeter was interposed between the electrodes and a TR6141 constant current generator made by Takeda Riken was connected as a load to an external circuit of the hydrogen-oxygen solid electrolyte fuel cell of the present invention obtained as described above. In this arrangement, the fuel cell was operated to test for MCD (maximum current density). The results were as shown in Table 1. To determine the degree of crystallinity of the $Cu_2O$ powder used, the peak width of the diffraction peak (1, 1, 1) of the powder was measured with an X-ray diffraction apparatus made by Rigaku Denki and the surface area of the powder was measured by the BET method. The data on the peak width (directly proportional to the particle diameter of $Cu_2O$ powder) and the surface area thus obtained are shown in Table 1.

TABLE 1

| $Cu_2O$ | MCD (mA/cm²) | Peak Width (10³Å) | Surface Area m²/g |
|---|---|---|---|
| (A) | 38 | 20 | 4.8 |
| (B) | 50 | 26 | 13 |
| (C) | 29 | 17 | 1.1 |
| (S) | 31 | 13 | 0.83 |

From Table 1, it is clearly noted that all the $Cu_2O$ types used herein exhibited high catalytic activity (MCD), that the MCD tended to increase in proportion as the degree of crystallinity decreased or the peak width rose, and that the MCD increased with the increasing surface area.

Figure 2:
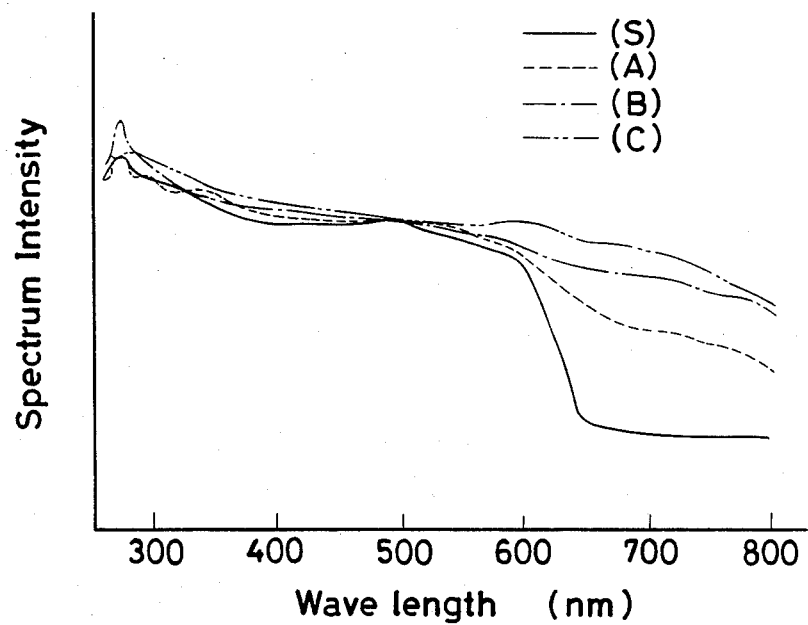
FIG. 2 is a graph showing the photoacoustic spectra of various $Cu_2O$ powders used in the working example described herein.

To investigate the degree of crystallinity of the $Cu_2O$ powder used from a different point of view, namely in terms of the condition of arrangement of crystals on the surface, the photoacoustic spectrum of the powder was measured with an instrument, OAS400, made by EDT Research Company of England. The results were as shown in FIG. 2. The data of FIG. 2 are believed to indicate that the degree of crystallinity decreased in proportion as the spectrum intensity at 700 nm, for example, increased. With the exception of the $Cu_2O$ types (C) which contained impurities, satisfactory agreement was found between the MCD's shown in Table 1 and the spectrum intensities of FIG. 2. This fact clearly implies that the MCD tended to increase in proportion as the degree of crystallinity decreased.

Figure 3:
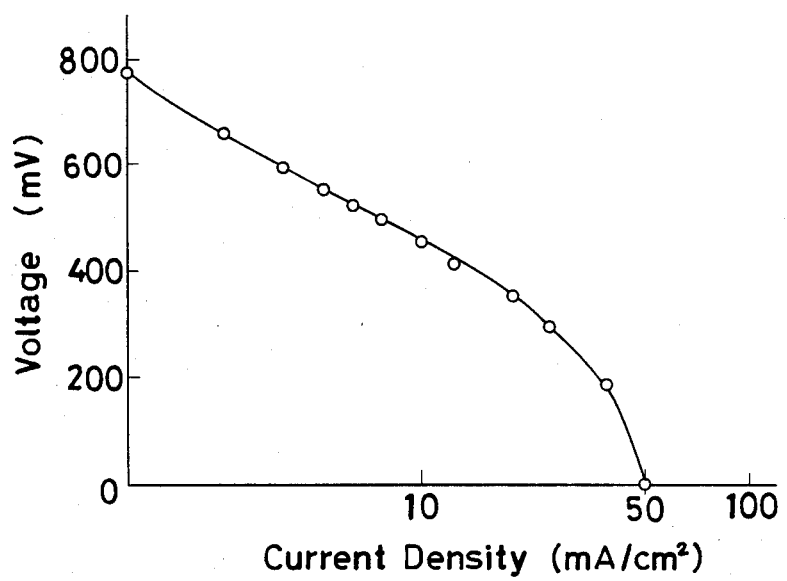
FIG. 3 is an ampere-voltage curve obtained of a hydrogen-oxygen solid electrolyte fuel cell using, as an oxidizing agent electrode catalyst, a $Cu_2O$ powder treated as described in (B) of the working example.

By way of representing the various test runs involved in the working example, the current-voltage curve obtained of the fuel cell using the $Cu_2O$ types (B) is shown in FIG. 3. From FIG. 3, it is clearly noted that the electromotive force is about 0.8 V and the MCD is 50 mA/cm².

EXAMPLE 2

Hydrogen-oxygen solid electrolyte fuel cells of the present invention were prepared by following the procedure of Example 1, except that the $Cu_2O$ powder produced as described in (B) was adopted and the oxygen electrode was produced from a mixture consisting of $Cu_2O$ powder and flake graphite in a weight ratio of 20:80 in one test run and 80:20 in another test run. These two fuel cells both showed electromotive force of about 0.8 V and MCD of 24 mA/cm².

What is claimed is:

1. A hydrogen-oxygen solid electrolyte fuel cell comprising an oxidizing agent electrode formed of an oxidizing agent electrode catalyst and a conducting agent, a fuel electrode, a solid electrolyte disposed between said two electrodes, and housings for supplying oxygen to said oxidizing agent electrode and hydrogen to said fuel electrode, which fuel cell is characterized by said solid electrolyte being one member selected from the group consisting of 12-molybdophosphoric acid and 12-tungstophosphoric acid, and said oxidizing agent electrode catalyst being $Cu_2O$.

2. A hydrogen-oxygen solid electrolyte fuel cell according to claim 1, wherein the weight ratio of said $Cu_2O$ to said conducting agent falls in the range of 1:10 to 10:1.

3. A hydrogen-oxygen solid electrolyte fuel cell according to claim 1, wherein said $Cu_2O$ is a product obtained by reducing at least one member selected from the group consisting of $Cu(CH_3COO)_2$ and $Cu(OH)_2$.

4. A hydrogen-oxygen solid electrolyte fuel cell according to claim 3, wherein said $Cu_2O$ is a product obtained by reducing $Cu(CH_3COO)_2$ with hydrazine at room temperature.

* * * * *

UNITED STATES PATENT AND TRADEMARK OFFICE
CERTIFICATE OF CORRECTION

PATENT NO. : 4,554,224

DATED : November 19, 1985

INVENTOR(S) : Nakamura, Osamu, et al

It is certified that error appears in the above-identified patent and that said Letters Patent is hereby corrected as shown below:

--The priority information in this Letters Patent was omitted. Please add the following priority number:

July 13, 1983    JAPAN    58-128150--

*Signed and Sealed this*

*Fourth* Day of *February 1986*

[SEAL]

*Attest:*

DONALD J. QUIGG

*Attesting Officer*    *Commissioner of Patents and Trademarks*